Aug. 6, 1929.   J. OWENS   1,723,437
LUBRICATING DEVICE
Filed Sept. 8, 1923   3 Sheets-Sheet 2
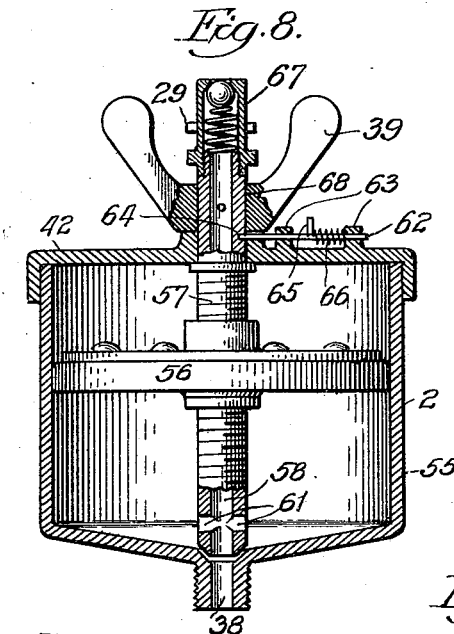
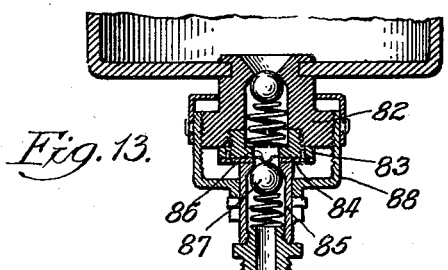
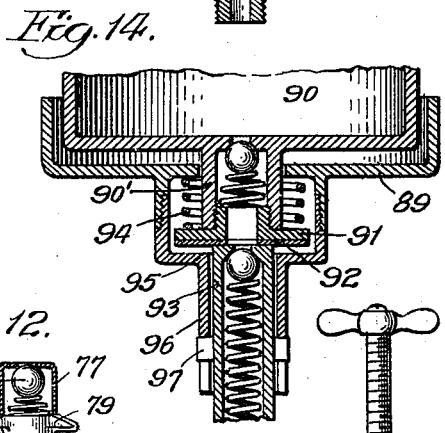
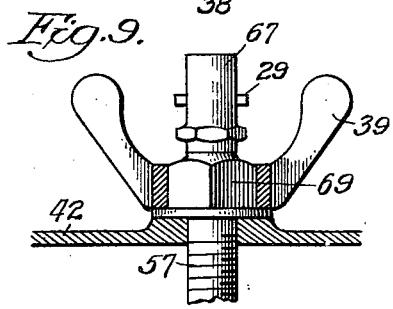
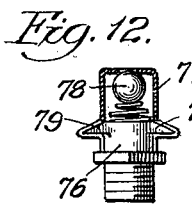
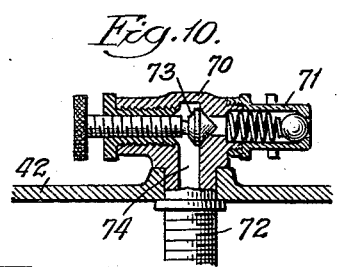
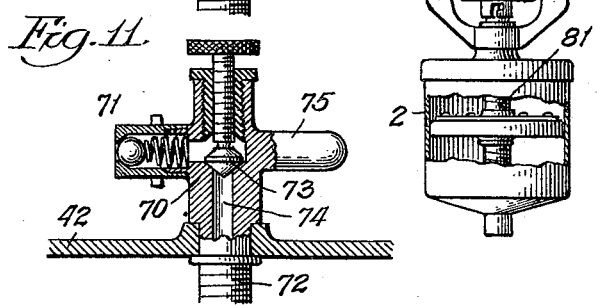
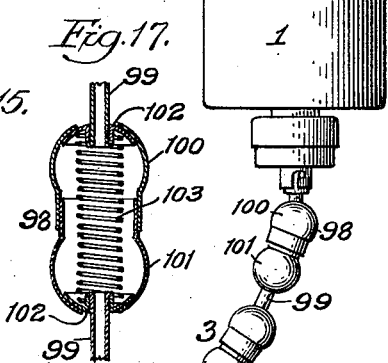
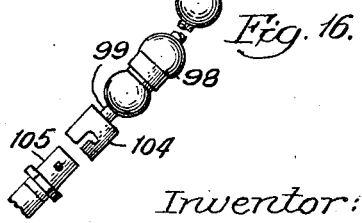
Inventor:
John Owens,
by Wallace R. Lane
Atty.

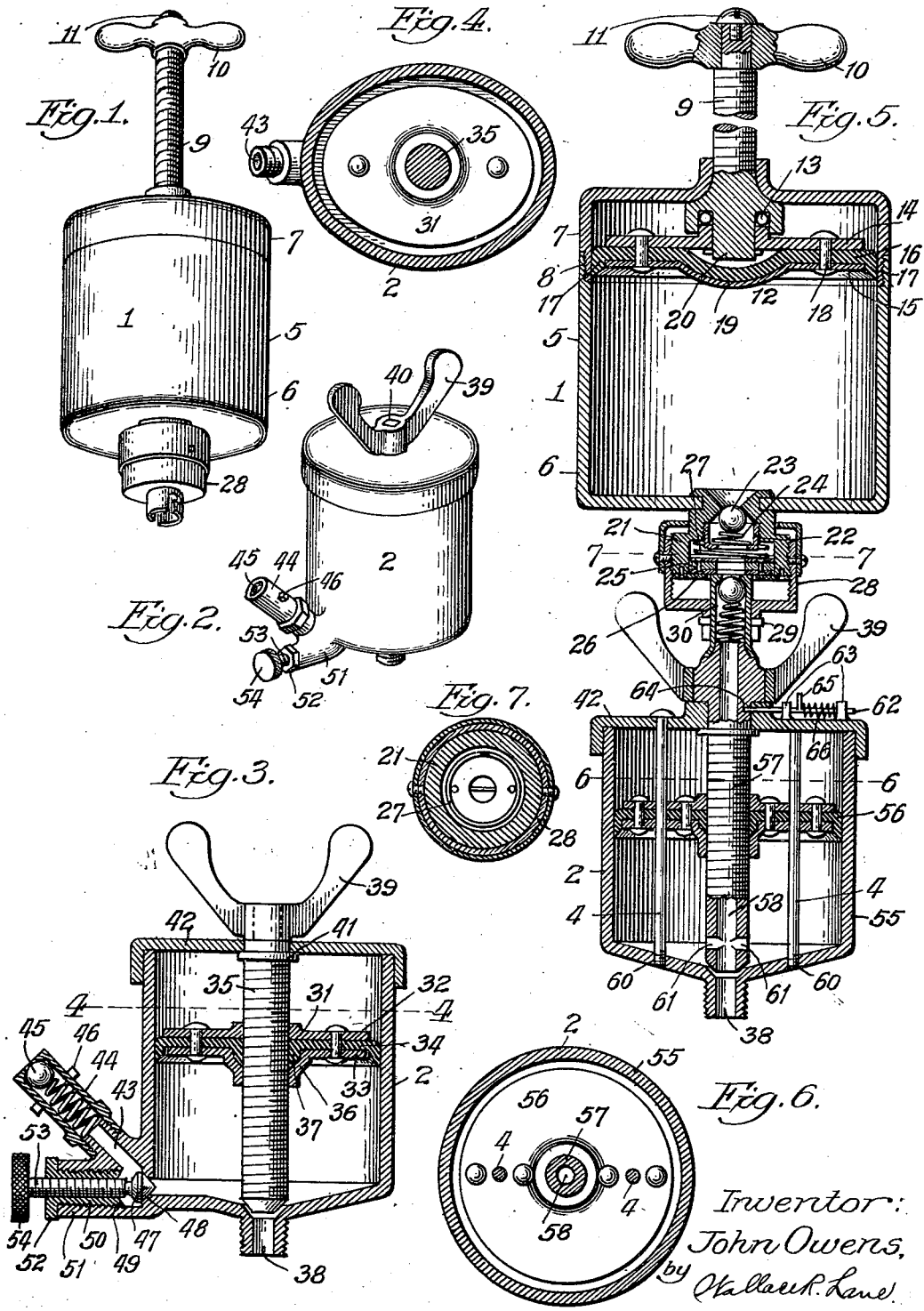

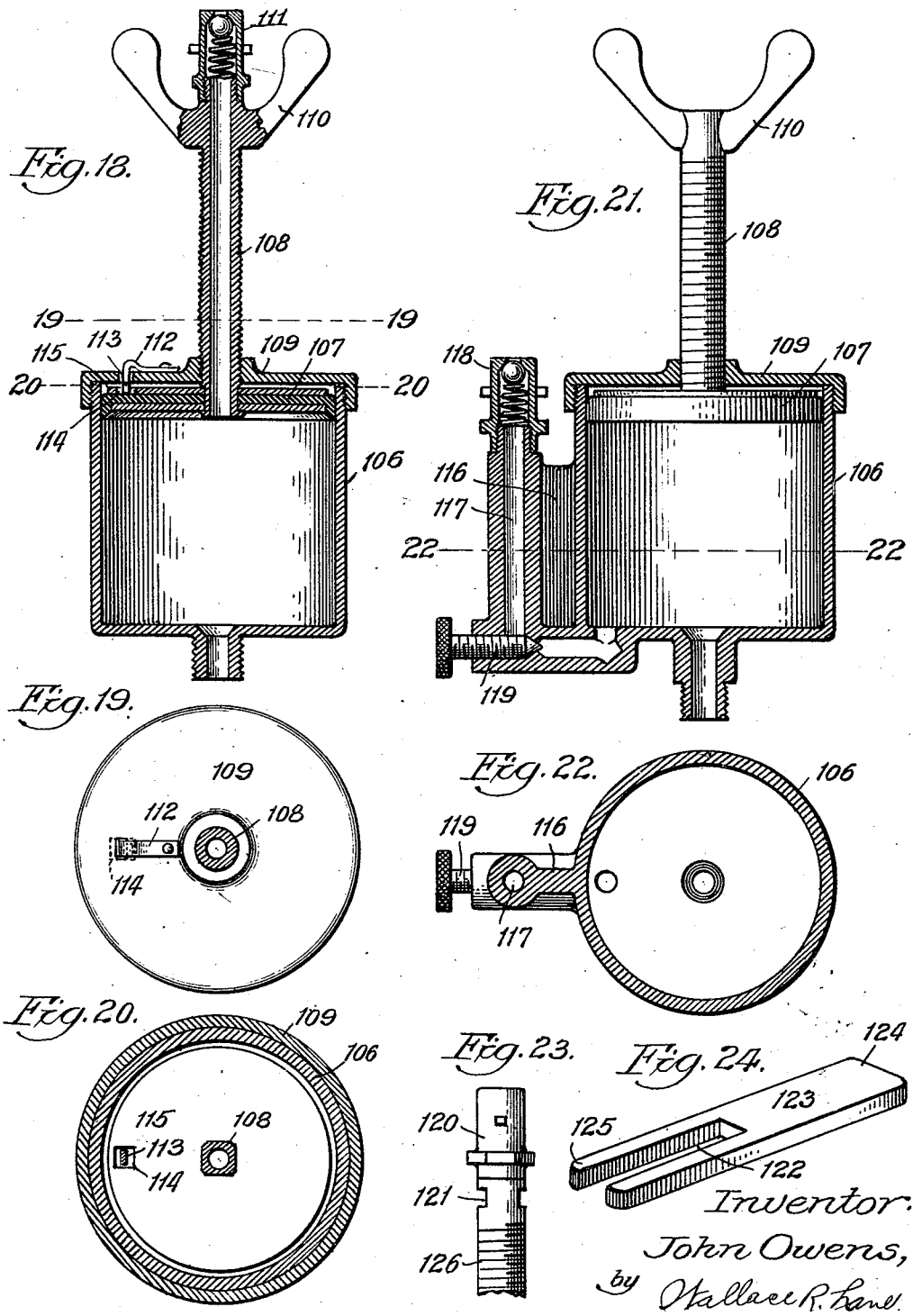

Patented Aug. 6, 1929.

1,723,437

UNITED STATES PATENT OFFICE.

JOHN OWENS, OF CHICAGO, ILLINOIS.

LUBRICATING DEVICE.

Application filed September 8, 1923. Serial No. 661,583.

The invention relates to lubrication, and has special reference to a grease cup, a grease gun and the means for connecting the two together when charging lubricant to a point desired.

Among the objects of the invention are to provide a new and improved grease cup or lubricant container adapted to be charged or filled without removal of the cap or top thereof and by means of a suitable grease gun; to provide such cup with a charging entry or inlet, preferably below the discharging piston of the cup and with suitable check valve means to which the grease gun may be detachably connected; to provide against the escape of grease, when the grease cup system is operated, by the check valve by the inclusion of a hand operated valve in the conduit or duct between the check valve and the container or the cup body; to construct the grease cup so that the piston will not rotate therein, preferably by making the cup and piston oval in shape or cross-section, or, if desired, in the case of the use of a circular grease cup in section, to prevent the turning of the piston by the use of suitable means passing through the piston and being connected to the cup; to provide means for preventing the turning of the stem of the piston during the charging operation with a grease gun so that the tendency of turning with the grease gun with the parts connected to it when charging the grease cup will not also cause a turning of the stem and a movement of the piston in the grease cup so that a full charge could not be inserted in the grease cup, or in other words, providing means whereby the grease cup may be fully charged without reacting, from the force supplied on the gun, preventing a full charge being effected; to provide against the jamming or clogging of the piston in the grease cup at one end of its movement, by providing a suitable lock mechanism to bring the piston to a stop when it reaches one end of its travel in the grease cup; to provide new and improved valve mechanism for the inlet end of the grease cup, such mechanism being so constructed that it will readily receive the grease gun connection; to provide a novel and improved connection between the grease gun and the grease cup so that when the connection is applied, or connected to the charging inlet of the grease cup, a seal will be effected, automatically, to prevent any escape or lateral ejecting of grease between the grease gun connection and the valve cage of the inlet of the grease cup; to provide novel and improved packing means for the pistons used in the grease cup and the grease gun so as to prevent the escape of lubricant or grease between the piston and the stem operating it, as well as to prevent a similar escape of grease behind the piston between the piston and the side walls of the gun or grease cup; to provide in one form of the invention, the grease cup stem and the grease gun stem with threads of opposite pitch so that when the grease gun stem is operated in one direction it will have the effect of causing the piston of the grease cup to move toward withdrawn position or remain in such position if already there, without causing the piston to move intermediate its limits whereby only a partial charge might be effected in the cup; to provide for novel means on the inlet connected to the grease cup for the reception of removable or detachable keys by which the stem of the grease cup piston may be operated, the keys being if desired normally disconnected, except when it is desired to operate the piston and the grease cup, when the key may be applied to operate the piston stem thereof; to provide for a novel check valve cage, preferably made of sheet metal, adapted to be compressed upon the body of the valve and held in place by suitable lugs, as desired; to provide for interchangeably connecting the grease gun to the grease cup directly, or indirectly through a flexible duct; to provide for a novel duct construction having sheet metal links having socket motion for effecting the flexibility desired; and to provide such further objects, advantages and capabilities as will later more fully appear and are inherently possessed by the invention.

In the accompanying drawings illustrating several embodiments of the invention; Fig. 1 is a perspective view of a grease gun constructed in accordance with the invention; Fig. 2 is a perspective view of a grease cup; Fig. 3 is a longitudinal sectional view of the grease cup shown in Fig. 2; Fig. 4 is a transverse sectional view of one form of a grease cup, such as shown in Figs. 2 and 3; Fig. 5 is a longitudinal sectional view through a grease gun, cup and one form of connection therebetween; Fig. 6 is a transverse sectional view taken on line 6—6 of Fig. 5; Fig. 7 is a transverse sectional view taken on line 7—7 of Fig. 5; Fig. 8 is a longitudinal sectional view of another form of grease cup; Fig. 9 is a sectional view of an operating key connection for the cup; Fig. 10 is a sectional view of a form of valve connection for a cup; Fig. 11 is a sectional view of another form of valve connection for a cup; Fig. 12 is a sectional view of a further form of a valve for a cup; Fig. 13 is a further form of connection between a gun and cup; Fig. 14 is a further form of a connection between a gun and cup; Fig. 15 is an elevation in part section, of a gun and cup with right and left hand screws; Fig. 16 is a perspective view in assembly of a gun, flexible duct and cup or conduit valve connection; Fig. 17 is a longitudinal sectional view of a link of the flexible connection; Fig. 18 is a longitudinal sectional view of a further form of cup; Fig. 19 is a transverse sectional view taken on line 19—19 of Fig. 18; Fig. 20 is a transverse sectional view taken on line 20—20 of Fig. 18; Fig. 21 is a longitudinal sectional view of a further form of cup; Fig. 22 is a transverse sectional view taken on line 22—22 of Fig. 21; Fig. 23 is an elevational view of a valve connection to a cup or conduit for a wrench key connection; and Fig. 24 is a perspective view of a wrench key for the same.

Referring now more particularly to the drawings, illustrating several forms of the invention, the lubricating device comprises a grease gun 1, a grease cup 2, and in the case of connecting the grease gun to the grease cup or to a distributing conduit of a machine, such as an automobile, also comprising a flexible duct 3, shown in Fig. 16 of the drawing. The grease gun, as well as the grease cup, may be of any desired shape in cross-section, such as oval as shown clearly in Fig. 4 of the drawing, or circular, as shown in Figs. 5 and 6 of the drawing, where the piston is prevented from turning about its axis in the grease cup, by suitable means, such as rods 4, as shown in Fig. 5 of the drawing.

In the form of grease gun shown in Figs. 1 and 5 of the drawing, the same comprises a body 5 having a lower section 6 and an upper section 7 suitably connected together, as by screw threads 8 and apertured at the ends, to receive, at one end, a threaded piston stem 9 having an operating handle 10 suitably secured to the stem 9 by means of a screw 11, and formed at its other end for suitable connection with a piston 12 by means of ball bearings 13. The piston 12 comprises metal plates 14 and 15 with an interposed soft gasket 16, such as leather, suitably cupped to form a flange 17 to seal against leakage between the outer edge of the piston 12 and the inner wall of the gun body as clearly shown in Fig. 5. The piston elements are suitably connected together by rivets 18 as clearly shown in Fig. 5. The central portion of the piston is suitably cupped to form a cup portion 19 of the gasket opposite the inner end 20 of the stem 9 so as to form an absolute seal against leakage of lubricant backward through the piston between the stem and the piston.

At the outer end of the gun is connected, in any suitable manner, a valve casing 21 within which is located a check valve cage 22 including a valve 23 and a spring 24 normally holding the valve upon its seat. Within the casing is provided a sealing member 25 capable of sliding in the casing 21 but held against a flange 26 suitably secured to the casing 21 by means of a spring 27. To the outside of the casing 21 is secured a socket member 28 having bayonet slots adapted to receive bayonet pins 29 secured to the side of an inlet valve body 30 of the charging inlet of a grease cup. The flange 26 has a central opening of a size sufficient to receive the inlet end of the valve body 30 when the grease gun is applied to the grease cup, as clearly shown in Fig. 5 of the drawing, and also to abut at its end against the packing of the sealing member 25, as clearly shown in Fig. 5.

It will be apparent from the above that when the threaded stem 9 is operated by hand so as to thread its way through the threaded open end of the gun, the piston 12 will be caused to advance and compress the lubricant beneath it and force the same outwardly through the discharge outlet of the gun by the valve 23 and into the charging inlet 30 of the grease cup. When the grease gun is connected to the charging inlet of the grease cup, by the bayonet joint connection, the sealing member 25 will seat upon the end of the member 30 and the spring 27 will constantly hold the sealing member in sealing contact so as to prevent leakage of the lubricant between the grease gun connection and the grease cup connection, the pressure imposed upon the lubricant aiding in holding the sealing member more firmly to its seat.

In the form of grease cup shown in Fig. 3, the body 2 is preferably oval shaped and has longitudinally slidable therein a piston 31 comprising a pair of metal plates 32 and 33 with an interposed leather packing 34 of annular form and flanged to form a seal between the edge of the piston and the inner wall of the cup and between the piston and the threaded portion of the stem 35. It will be noted that the inner or central portion of the lower plate 33 has a hollow boss 36 within which the flanged portion 37 of the packing 34 is compressed so as to form a seal between the piston and the threaded portion of the stem 35. The stem 35 is rotatable within the cup and the piston so as to cause the piston to move longitudinally to compress lubricant beneath it to discharge the same through the outlet 38 of the cup. The stem may be rotated by means of a hand key 39 having a square socket detachably fitting upon the squared end 40 of the stem. The latter has a thrust collar 41 for taking up the thrust of the stem within the cup and against the cover 42 of the cup.

When it is desired to charge this cup with grease, the stem 35 is rotated to cause the piston to be moved towards the cover 42. From the side and lower portion of the cup extends a charging conduit 43 having a check valve casing 44 within which is located a spring check valve 45. To the outside of the body 44 is provided bayonet pins 46 adapted to be received in the bayonet slots of the grease gun. The conduit 43 also has a hand valve 47 controlling the passage of the grease through the conduit. This hand valve is preferably formed with two seats to close against a seat 48 on a grease cup and a seat 49 on the inner end of a sleeve 50 threaded into a hub portion 51 of the grease cup. The outer end of the sleeve 50 is formed with a hex-head 52 for connecting the sleeve in place by the use of a wrench. The valve 47 has a threaded stem 53 threaded into sleeve 50 and a head 54 for manual operation. When it is desired to charge grease into the cup, the valve 47 is operated to open the passage into the cup and to seat the valve on the valve seat 49 so that the compressed lubricant will not pass or leak outwardly between the threads of the stem 53 and the sleeve 50. After the cup is charged with grease the valve 47 is closed as shown in Fig. 3 of the drawing. The purpose of this valve is to prevent the leakage of grease by the check valve 45 when the grease is placed under compression to force the same through the outlet 38 to the point to be lubricated. The check valve 45 will not always operate sufficiently tight so as to prevent leakage when pressure is placed upon the grease.

In the form of grease cup shown in Fig. 5, it comprises a body 55 in which is longitudinally movable a piston 56 provided with packing of the kind shown in Fig. 3, and operated by a threaded stem 57, which in this case is tubular to provide a passage 58 therein and communicating with an inlet discharge valve 30 comprising a spring check valve, as clearly shown in Fig. 5. The outer end of the stem may have an enlarged head, of polygonal shape to receive the operating key 39. In order to prevent the rotation of the piston 56, suitable rods may be passed through the cap 42 of the cup and extend through suitable apertures in the piston 56 and threaded, at its lower ends, into the apertures 60 in the lower part of the cup.

When it is desired to charge this cup with grease, the key 39 may be connected to rotate the stem 57 so as to raise the piston 56. A grease gun may then be connected to the body portion 30 of the valve and operated to discharge grease down through the passage 58 and through lateral passages 61 into the chamber of the grease cup beneath the piston.

When a grease gun is connected to a grease cup, and force is applied to the handle 10 so as to cause rotating of the stem 9, the grease gun also tends to rotate from this force, whereby the stem 57 also tries to rotate in the same direction. If the latter did so rotate, even though it be a small amount, it would cause the piston to move downwardly and the grease cup could not be filled to full capacity. Therefore, when the piston 56 is withdrawn, a locking device is used to hold the stem 57 in locked or non-rotating position. This locking device comprises a slide bar or bolt 62 slidable in lugs 63 formed on the cap 42 of the cup and having its end portion projecting into a recess 64 formed in the side of the stem 57, as clearly shown in Fig. 5 of the drawing. The bolt also has a finger piece 65 by which it may be withdrawn from locked position. Normally a spring 66 is used to hold the bolt in locked position. In the form of cup shown in Fig. 5 the same is shown as cylindrical in cross-section, but if desired the same may be oval or other form in cross-section, as shown in Fig. 8 of the drawing. In other respects the construction of the cup in Fig. 8 is the same in detail as that shown in Fig. 5 of the drawing, the rods 4 being omitted. The inlet valve casing 67, in this form of device, is shown as threaded to the upper or outer end of the stem 68 instead of being welded or compressed upon the outer end of the stem as shown in Fig. 5. It will also be noted that the key has a smaller socket, but if desired, the socket may be made larger to receive an enlarged head 69 upon the stem as shown in Fig. 9 so that the key may be readily connected and disconnected over the valve casing 67 without necessitating taking apart of the casing 67 and the end portion 68.

The charging valve may be of different forms as shown in Figs. 10 and 11. As for example, when pressure is placed upon the grease being discharged from the cup, of the form shown in Figs. 5 and 8, the pressure will react through the stem against the check valve, and owing to the fact that check valves do not always absolutely seal the outward passage of the grease, a hand valve may be provided the same as that shown in Fig. 3 of the drawing, such hand valve being shown in Figs. 10 and 11 in the charging valve. In the charging valve shown in Fig. 10 it comprises a body portion 70, a check valve casing 71, an operating stem 72 for the piston in the cup and a hand valve 73 adapted to control the conduit 74. In this case the valve casing 71 extends laterally from one side of the body 70 and the hand valve 73 at the other side so that it forms a sort of T-head which may be grasped with the hand so as to form a sort of handle for operating the stem 72. In the form shown in Fig. 11 the hand valve is shown in vertical position, and laterally opposite the check valve casing 71 is rigidly or integrally formed an arm 75 which together with the casing 71 will serve as sort of cross member for the hand grip for operating the stem 72.

In the above described forms the charging valve is shown of relatively thick metal, such as cast material, but the casing might be made with sheet metal. In the form shown in Fig. 12 the charging valve comprising a body portion 76 and a valve casing 77 including a spring pressed valve 78. The body 76 has lateral lugs 79 and the casing 77 is made of sheet metal and compressed into place so as to have a tight fit about the body 76 and over the lugs 79, the latter acting to prevent the casing 77 from becoming detached. These lugs together with the portions of the sheet metal compressed over them, form bayonet pins for the reception of the bayonet socket of the grease gun.

In Fig. 15 is shown a grease gun connected to a grease cup, either being of any form desired, but constructed in accordance with the invention, and showing the screw threads of the piston stem 80 of the grease gun of an opposite pitch from the stem 81 of the grease cup. In the particular case mentioned, the threads of the stem 80 are right hand threads and those of the stem 81 are left hand threads, but it will, of course, be understood that they may be the opposite, namely, the stem 80 having left hand threads and the stem 81 having right hand threads. It is important that they should have opposite threads, because when the stem 80 is rotated, the grease gun tends to rotate with it, and by reason of the connection of the grease gun with the stem 81 it tends to rotate the latter in the same direction, so that if it were threaded the same way, it would cause the piston in the grease cup to move downwardly so that a complete charging of the grease cup could not be effected. By forming the threads with opposite pitch, this disadvantage is removed, so that if the stem 81 does move, it will effect a withdrawing of the piston upwardly until the piston hits with the cap of the grease cup, and the latter may be completely charged.

In Fig. 13 is shown another form of connection between the grease gun and the grease cup charging inlet and comprises a valve casing 82 to which is threaded a plug 83 carrying a sealing member 84 adapted to engage with the outer end of the charging valve 85, as clearly shown in Fig. 13. Between the sealing members 83 and 84 is provided a bent member 86 which is adapted to press down upon the check valve 87 of the charging valve. This is for the purpose of aiding in holding the valve 87 open when the grease is being forced into the grease cup or conduit to which the valve 85 is connected. Within the casing 82 is located a suitable spring press check valve as clearly shown. To the casing 82 is also connected a socket member 88 having bayonet slots for the reception of the bayonet pins fixed to the valve 85.

In Fig. 14 is shown a further connection between a grease gun and grease cup. This connection comprises a cup 89 sufficiently large to receive the lower end 90 of a grease gun. This cup has a non-cylindrical hub 90' fitting a similarly shaped opening in the bottom of cup 89 and to this is threaded a plug 91 carrying a sealing member 92 adapted to seat against the outer end of the charging valve 93 as clearly shown in Fig. 14. The cup 89 and the plug 91 have spaced flanges between which is interposed a coiled spring 94 which normally acts to hold the cup 89 upward so that a shoulder 95 thereof would normally seat against the plug 91 when not in use. The lower end of the cup portion is formed with a socket 96 provided with suitable bayonet slots for receiving pins 97 fixed to the valve 93, as shown in Fig. 14. When the gun 90 together with the cup 89 is connected to the valve 93, the operator needs to apply considerable pressure when the bayonet connection is effected and then the spring 94 presses against the flange of the plug 90' so as to hold it constantly in contact or seated against the outer end of the valve 93. Incidentally, the spring also reacts against the cup member to hold the socket 96 locked so the bayonet joint will not slip out of locking connection.

In Fig. 16 is shown a grease gun connected to a flexible duct. It will be understood that the grease gun is interchangeably connected directly to a grease cup charging inlet, or, when a grease cup is not used, it may be connected directly to the charging inlet of the conduits connected to the machine to be lubricated or to the flexible duct as shown in Fig. 16. In this case the duct is interposed between the grease gun and the charging inlet of the grease cup or conduit. This duct comprises a series of links 98 and tubes 99. Each link 98 comprises a sheet metal member formed from a pair of end members 100 and 101 connected together in any suitable manner. The ends of these are partly spherical in shape and apertured so as to permit in the apertures a free movement of the ends of the tubes 99 as shown in Fig. 17. The inner end of each tube 99 is secured to a socket member 102 capable of a ball and socket movement within the end 100 or 101 of the link. The construction of the socket is clearly shown in Fig. 17. A spring 103 may be interposed between the sockets 102 at both ends of the links to hold them constantly in place and sealing position. The apertures at the ends of the members 100 and 101 are sufficiently large to permit a certain amount of lateral movement of the tubes 99 to the extent of forming a flexible duct, a flexed position of which is shown in Fig. 16. At one end of the duct is connected to one tube 99 an inlet valve connection similar to that shown in Fig. 12 or constituting the charging inlet valve of a grease cup, as shown in the other figures of the drawings, so as to be connected by a bayonet connection to the grease gun. At the other end, the tube 99 is connected to a bayonet socket 104 adapted to be suitably connected to a charging valve inlet 105 connected either to a grease cup or to the charging end of the conduits of the lubricating system upon a machine.

In Fig. 18 is shown another form of grease cup, in which is shown a body 106 for containing the grease, a piston 107 slidable therein and to which is rigidly fastened a threaded piston stem 108 threaded through an opening in the cap 109 of the cup. In this case the stem travels a considerable distance outside of the cup. The outer end of the stem has preferably formed integral therewith a key or thumb piece 110 by which the stem may be rotated to cause a movement of the same, together with the piston 107, inwardly in the cup 106. The outer end of the stem 108 is provided with a suitable form of charging valve inlet 111. It has been found that when withdrawing the piston to full extent it oftentimes jams with the cover 109. In order to prevent this, the cover is provided with a lock member 112, which is preferably of spring metal and has a tongue 113 projecting through an aperture formed in the cover 109 and capable of engaging in a recess 114 formed in a plate 115 of the piston. When the piston arrives at its upper limit movement, the same will engage with the end 113 of the spring until the aperture 114 comes opposite that end when the latter will snap into the aperture and prevent further turning of the piston and hence a jamming of it against the cap 109. In order to release this, the spring member may be lifted in any desired manner, manually.

In Fig. 21 is shown a grease cup similar to that shown in Fig. 18, but the charging inlet is through an independent passage instead of through the stem 108. This passage is constructed similar to that shown in Fig. 3, but extends substantially parallel with a side of the cup and is connected to it by a web 116 formed integral with the cup and the conduit 117. This conduit has, at its upper end, a charging valve device 118, constructed as shown, or of any of the forms above described and applying to the other forms shown upon the drawings. At the lower end of the conduit may be provided a simple needle valve 119 adapted to close the passage from the cup to the valve 118 when pressure is applied upon the grease so as to prevent leakage thereof past the valve 118.

In the forms above described, the stem of the piston in the grease cup is operated by a key having thumb members or arms as clearly shown in Figs. 2, 3, 5, 8, 9, 18 and 21. If it is desired, a different form of key may be used. In Figs. 23 and 24 is shown such form. In Fig. 23 is shown any one of the charging valve devices 120 having a pair of oppositely disposed flattened surfaces or notches 121 so spaced so as to fit into a slot 122 in a wrench key 123, shown in Fig. 24 of the drawing. This wrench may be slid into place so that the notches 121 will be substantially at the middle or central portion of the key 123 so that both ends 124 and 125 of the key may be grasped by the hand and turned so as to cause a turning of the stem 126 connected to or operating with any of the pistons shown in any of the grease cups described above.

While I have herein described and shown upon the drawings a few embodiments of my invention, it is to be understood that the invention is not limited to the particular constructions, details and arrangements of parts shown and described, but that other constructions, details and arrangements of parts are comprehended by the invention without departing from the spirit thereof.

Having now described my invention, I claim:

1. The combination with a grease gun, of a valve casing carried thereby having an outlet passage provided with a seat; a spring pressed outwardly opening valve member normally engaging said seat to close said passage said valve being opened only by pressure from within said gun; sealing means carried by said valve casing, adapted to engage and form a packed joint with the inlet portion of a lubricant-receiving instrumentality; and a housing carried by said valve casing and substantially enclosing the same, provided with means for readily detachably connecting said casing to said receiving instrumentality.

2. The combination with a grease gun, of a valve casing secured thereto having an outlet passage provided with a seat; a spring pressed outwardly opening valve member normally engaging said seat to close said passage said valve being opened only by pressure from within said gun; a spring pressed sealing member slidably mounted within said casing, adapted to engage and form a packed joint with the inlet portion of a lubricant-receiving instrumentality; and a housing secured to the exterior of said valve casing, substantially enclosing the same, provided with means for readily detachably connecting said casing to said receiving instrumentality.

3. The combination with a grease gun, of a valve casing having an outlet passage comprising a bore, a counterbore and a valve seat; a spring pressed outwardly opening valve member normally engaging said seat to close said passage said valve being opened only by pressure from within said gun; a valve-retaining cage mounted in said bore; a spring pressed sealing member slidably mounted in said counterbore; adapted to engage and form a packed joint with the inlet portion of a lubricant receiving instrumentality; and a housing threaded to the exterior of said casing, substantially enclosing the same, and provided with means for readily detachably connecting said casing to said receiving instrumentality.

4. A lubricating device comprising a gun, a cup, means for detachably connecting the gun to the cup, said gun and cup each having a plunger and a threaded stem for operating the plunger, the stems being oppositely pitched in thread whereby the operation of the gun plunger effects a reaction on the cup plunger to maintain the latter in withdrawn position.

In witness whereof, I hereunto subscribe my name to this specification.

JOHN OWENS.